(12) United States Patent
Takahashi

(10) Patent No.: US 7,541,605 B2
(45) Date of Patent: Jun. 2, 2009

(54) RADIATION IMAGE INFORMATION DETECTING PANEL

(75) Inventor: Kenji Takahashi, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/406,343

(22) Filed: Apr. 19, 2006

(65) Prior Publication Data

US 2006/0231781 A1    Oct. 19, 2006

(30) Foreign Application Priority Data

Apr. 19, 2005    (JP) .............................. 2005-121027

(51) Int. Cl.
*G03C 5/16* (2006.01)

(52) U.S. Cl. .................................................. 250/580

(58) Field of Classification Search ......... 250/580–591, 250/483.1, 484.2, 475.2, 486.1, 487.1, 484.4
See application file for complete search history.

(56) References Cited

U.S. PATENT DOCUMENTS

| | | | | |
|---|---|---|---|---|
| 4,880,987 A * | 11/1989 | Hosoi et al. | ............... | 250/484.4 |
| 5,059,794 A * | 10/1991 | Takahashi et al. | ............ | 250/591 |
| 6,169,357 B1 * | 1/2001 | Potter | ......................... | 313/495 |
| 6,376,857 B1 | 4/2002 | Imai | | |
| 6,642,650 B1 * | 11/2003 | Struye et al. | ................ | 313/502 |
| 2001/0045535 A1 * | 11/2001 | Yasuda | ........................ | 250/587 |
| 2003/0057388 A1 * | 3/2003 | Imai et al. | .................... | 250/586 |

FOREIGN PATENT DOCUMENTS

JP    2000-338297 A    12/2000
KR    10-2003-0031927       * 4/2003

OTHER PUBLICATIONS 1992-422301, Nov. 1992, Derwent, BoGaert J.*

* cited by examiner

*Primary Examiner*—David P Porta
*Assistant Examiner*—Djura Malevic
(74) *Attorney, Agent, or Firm*—Sughrue Mion, PLLC

(57) ABSTRACT

A laminate comprises a stimulable phosphor layer, which is capable of storing radiation image information, and which is capable of emitting light of an intensity proportional to the radiation image information when being exposed to secondary stimulating rays, a response speed converting fluorescent substance layer, which is capable of converting the light emitted by the stimulable phosphor layer into light having a life time longer than a light emission life time of the light emitted by the stimulable phosphor layer, and a photo-conductor layer, which is capable of exhibiting electrical conductivity when being exposed to the light obtained from the conversion performed by the response speed converting fluorescent substance layer. The laminate and an electroluminescent layer, which is capable of emitting the secondary stimulating rays with voltage application, are overlaid one upon the other and combined with each other into an integral body.

15 Claims, 5 Drawing Sheets

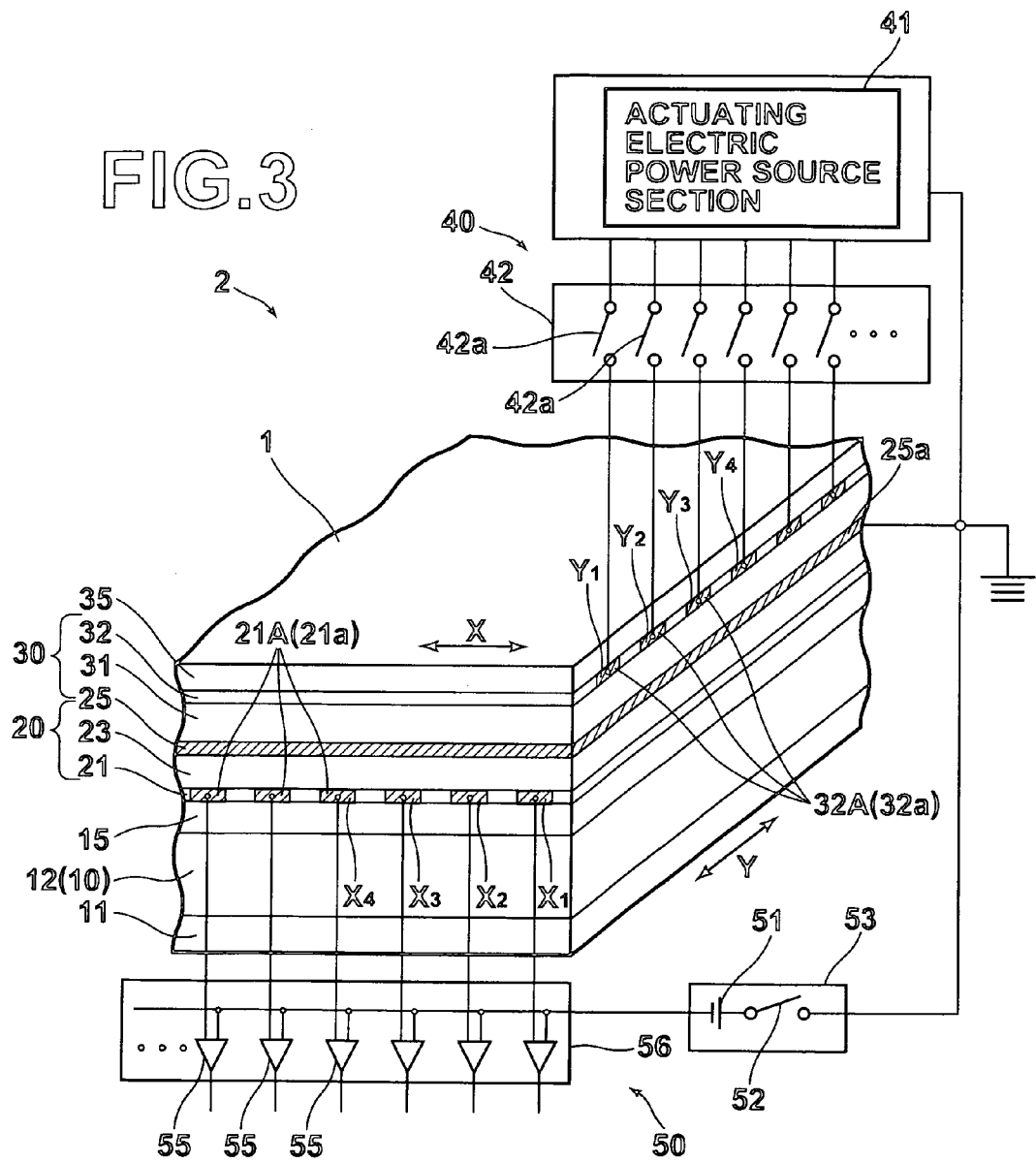

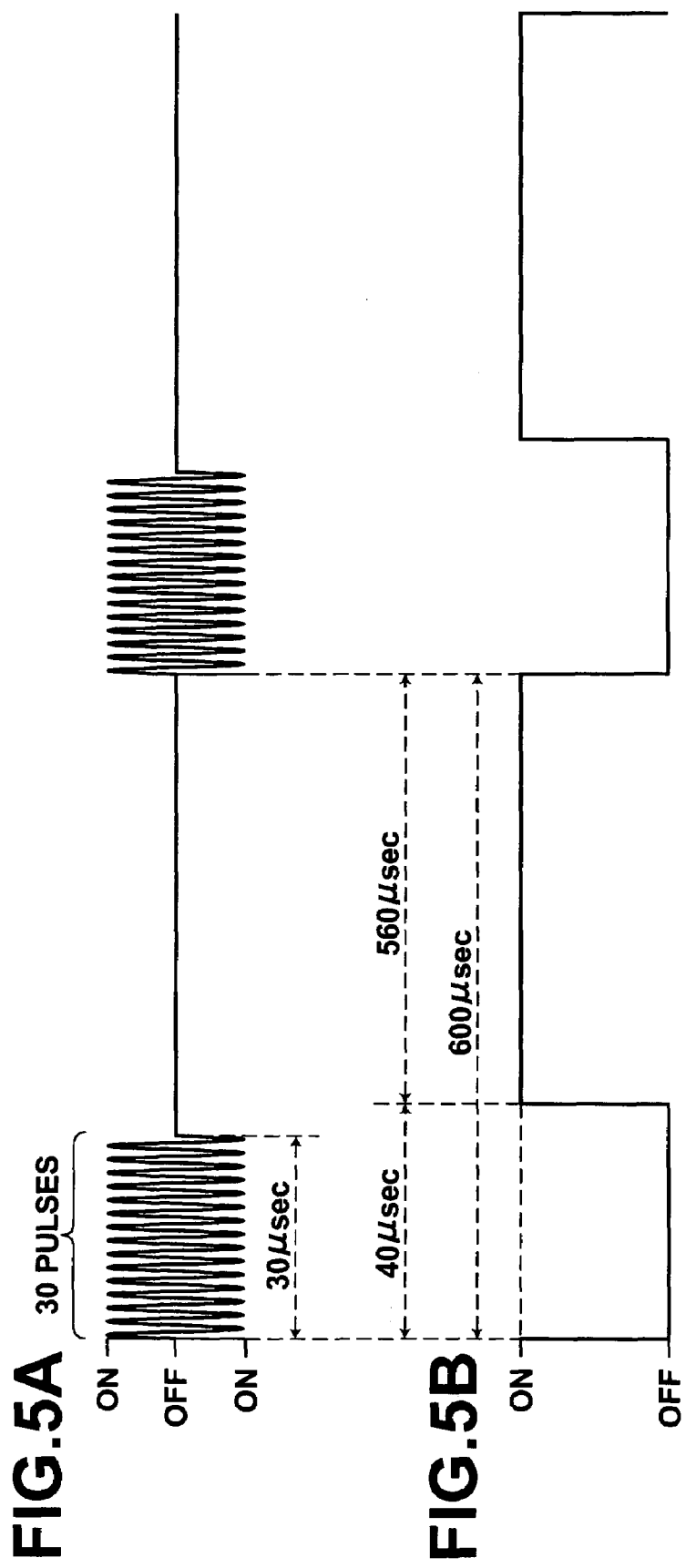

RADIATION IMAGE INFORMATION DETECTING PANEL

BACKGROUND OF THE INVENTION

1. Field of the Invention

This invention relates to a radiation image information detecting panel, which comprises a stimulable phosphor layer capable of storing radiation image information and read-out means for reading out the radiation image information from the stimulable phosphor layer, the stimulable phosphor layer and the read-out means being combined with each other into an integral body.

2. Description of the Related Art

As image recording media for recording radiation images with medical X-ray image recording operations, and the like, stimulable phosphor sheets and electrostatic latent image recording sheets have heretofore been proposed. The stimulable phosphor sheets are capable of storing radiation energy in accordance with radiation image information (with primary stimulation). Also, the stimulable phosphor sheets, on which the radiation energy has been stored, are capable of emitting light in proportion to the amount of the stored energy when the stimulable phosphor sheets are exposed to reading light (with secondary stimulation). The electrostatic latent image recording sheets are capable of recording image information as electrostatic latent images. Also, the electrostatic latent image recording sheets are capable of generating electric currents in accordance with the electrostatic latent images when the electrostatic latent image recording sheets are exposed to reading light.

Ordinarily, in cases where the image information is to be read out from the image recording media, on which the image information has been recorded, the reading light or secondary stimulating rays are irradiated to the image recording media, and the recorded image information is thereby read out.

An image read-out apparatus utilizing a panel-shaped light source as the light source for producing the secondary stimulating rays has been proposed in, for example, U.S. Pat. No. 6,376,857. With the proposed image read-out apparatus, the panel-shaped light source is provided with an electroluminescent layer (hereinbelow referred to as the EL layer) and is combined with an image recording medium, which is of an electrostatic latent image recording type, into an integral body.

With respect to a technique for reading out an image from a stimulable phosphor sheet, a system for performing an image read-out operation by use of a radiation image detecting panel has been proposed in, for example, Japanese Unexamined Patent Publication No. 2000-338297. Such that the time required for image readout may be kept short, such that the apparatus size may be kept small, and such that the cost may be kept low, the radiation image detecting panel is constituted of a stimulable phosphor sheet and a photo-conductor layer, which has an area approximately identical with the area of the stimulable phosphor sheet and has sensitivity with respect to the light emitted by the stimulable phosphor sheet when the stimulable phosphor sheet is exposed to the secondary stimulating rays, the stimulable phosphor sheet and the photo-conductor layer being combined with each other into an integral body. With the system for performing the image read-out operation by use of the radiation image detecting panel as proposed in, for example, Japanese Unexamined Patent Publication No. 2000-338297, the radiation image detecting panel, on which the image information has been recorded, is scanned with spot light in two-dimensional directions, or is linearly scanned with line light, and the image read-out operation is thereby performed. Specifically, the system for performing the image read-out operation as proposed in, for example, Japanese Unexamined Patent Publication No. 2000-338297, is concerned with an image information read-out apparatus, wherein the photo-conductor layer contains a-Se as a principal constituent in order for the weak light emitted by the stimulable phosphor sheet to be detected with a high sensitivity, and wherein an electric field capable of causing avalanche amplification to occur is applied. Also, in, for example, Japanese Unexamined Patent Publication No. 2000-338297, it is described that a surface-shaped light source acting as the secondary stimulating ray source may be combined with the stimulable phosphor sheet into an integral body, and the image read-out operation may be performed through electrical scanning. Further, in, for example, Japanese Unexamined Patent Publication No. 2000-338297, it is described that the photo-conductor layer, which will absorb little red secondary stimulating rays, actually has a slight sensitivity with respect to the red secondary stimulating rays carrying no image information, and that therefore an offset current corresponding to fine electric charges occurring due to the secondary stimulating rays is generated. It is further described therein that, in cases where the secondary stimulating rays are irradiated from the side of the stimulable phosphor sheet, in order for the occurrence of the offset current to be suppressed, a stimulating ray cut-off filter may be inserted between the stimulable phosphor layer and an electrode layer, or between the electrode layer and the photo-conductor layer.

In the image readout from an image information detecting sheet (i.e., an electrostatic recording sheet) of the type, in which the radiation image information is recorded as the electrostatic latent image, as described in, for example, U.S. Pat. No. 6,376,857, the electric current, which occurs within the electrostatic recording sheet due to the irradiation of the reading light to the electrostatic recording sheet, is detected directly. In the image readout from the image information detecting sheet (i.e., the stimulable phosphor sheet) of the type, in which the energy of the radiation is stored, as described in, for example, Japanese Unexamined Patent Publication No. 2000-338297, the light, which is emitted by the stimulable phosphor sheet due to the irradiation of the secondary stimulating rays to the stimulable phosphor sheet, is read out. At the time of the image readout from the stimulable phosphor sheet, the two kinds of light, i.e. the light emitted by the stimulable phosphor sheet and the secondary stimulating rays will mix together. Therefore, in order for the image readout to be performed accurately (i.e., with a high signal-to-noise ratio) by use of the radiation image detecting panel, which comprises the photo-conductor layer and the stimulable phosphor sheet combined with each other into an integral body, in cases where a layer having the sensitivity with respect to the light emitted by the stimulable phosphor sheet is utilized as the photo-conductor layer, it is actually necessary that the secondary stimulating rays and the light emitted by the stimulable phosphor sheet are separated from each other, and that an adverse effect (i.e., the offset current described above) due to the secondary stimulating rays is thereby suppressed.

SUMMARY OF THE INVENTION

The primary object of the present invention is to provide a radiation image information detecting panel, wherein light emitted by a stimulable phosphor layer and secondary stimulating rays are capable of being sufficiently separated from each other, and wherein image information is capable of being detected with a high signal-to-noise ratio.

Another object of the present invention is to provide a radiation image information detecting panel, wherein light emitted by a stimulable phosphor layer and secondary stimulating rays are capable of being sufficiently separated from each other, and wherein image information with a high image sharpness is capable of being detected.

The present invention provides a first radiation image information detecting panel, comprising:

a stimulable phosphor layer, which is capable of storing radiation image information, and which is capable of emitting light of an intensity proportional to the radiation image information when secondary stimulating rays are irradiated to the stimulable phosphor layer;

a response speed converting fluorescent substance layer, which is capable of converting the light emitted by the stimulable phosphor layer into light having a life time longer than a light emission life time of the light emitted by the stimulable phosphor layer;

a photo-conductor layer, which is capable of exhibiting electrical conductivity when the light having been obtained from the conversion performed by the response speed converting fluorescent substance layer is irradiated to the photo-conductor layer; and an electroluminescent layer capable of emitting the secondary stimulating rays, which are to be irradiated to the stimulable phosphor layer, when a voltage is applied across the electroluminescent layer, all of the layers being overlaid one upon another and combined with one another into an integral body.

Further, the first radiation image information detecting panels in accordance with the present invention may be modified such that a laminate including the stimulable phosphor layer, the response speed converting fluorescent substance layer and the photo-conductor layer and the electroluminescent layer are overlaid one upon the other and combined with each other into an integral body.

The term "overlaid and combined into an integral body" as used herein means that a different layer may be located at one of various layer positions in the layer constitution of the radiation image information detecting panel, such as the position between adjacent layers, the position on either side of a layer (or the position on or under the layer), the position within the laminate, or the position on either side of the laminate (or the position on or under the laminate). Also, the layers contained in the laminate may be overlaid in any order. For example, in the cases of the laminate constituting the first radiation image information detecting panel in accordance with the present invention, the three layers contained in the laminate, i.e. the stimulable phosphor layer, the response speed converting fluorescent substance layer, and the photo-conductor layer, may be overlaid one upon another in any order. The term "overlaying in this order" as used herein means that it is sufficient for the relationship between the positions of the layers to conform to the specified order.

The response speed converting fluorescent substance layer is the layer containing a certain fluorescent substance, which is capable of emitting light in proportion to the intensity of the light emitted by the stimulable phosphor layer when the light emitted by the stimulable phosphor layer is irradiated to the certain fluorescent substance. The light emitted by the fluorescent substance contained in the response speed converting fluorescent substance layer has a life time longer than the light emission life time of the light emitted by the stimulable phosphor layer. Specifically, the light having been obtained from the conversion performed by the response speed converting fluorescent substance layer is the light, which is emitted by the response speed converting fluorescent substance layer.

The term "light emission life time of a layer" as used herein means the light emission life time of the light, which is emitted by the light emitting substance contained in the layer. Also, the term "light emission life time" as used herein means the time required for the intensity of the light emitted at the time, at which the stimulating rays are turned off, to become equal to a level of 1/e.

The first radiation image information detecting panel in accordance with the present invention may be modified such that the electroluminescent layer is a layer capable of emitting light acting as the secondary stimulating rays, which light has a pulse width sufficiently shorter than the light emission life time of the response speed converting fluorescent substance layer.

The present invention also provides a second radiation image information detecting panel, comprising:

a stimulable phosphor layer, which is capable of storing radiation image information, and which is capable of emitting light of an intensity proportional to the radiation image information when secondary stimulating rays are irradiated to the stimulable phosphor layer;

a photo-conductor layer, which is capable of exhibiting electrical conductivity when the light emitted by the stimulable phosphor layer is irradiated to the photo-conductor layer; and an electroluminescent layer capable of emitting light acting as the secondary stimulating rays, which are to be irradiated to the stimulable phosphor layer, when a voltage is applied across the electroluminescent layer, the light emitted by the electroluminescent layer having a pulse width sufficiently shorter than the light emission life time of the light emitted by the stimulable phosphor layer, all of the layers being overlaid one upon another and combined with one another into an integral body.

The present invention further provides a third radiation image information detecting panel, comprising:

a stimulable phosphor layer, which is capable of storing radiation image information, and which is capable of emitting light of an intensity proportional to the radiation image information when secondary stimulating rays are irradiated to the stimulable phosphor layer;

an electroluminescent layer capable of emitting the secondary stimulating rays, which are to be irradiated to the stimulable phosphor layer, when a voltage is applied across the electroluminescent layer;

an optical filter layer for cutting off the secondary stimulating rays, which have been emitted by the electroluminescent layer; and a photo-conductor layer, which is capable of exhibiting electrical conductivity when the light emitted by the stimulable phosphor layer is irradiated to the photo-conductor layer, the stimulable phosphor layer, the electroluminescent layer, the optical filter layer, and the photo-conductor layer being overlaid one upon another in this order and combined with one another into an integral body.

The present invention still further provides a fourth radiation image information detecting panel, comprising:

a stimulable phosphor layer, which is capable of storing radiation image information, and which is capable of emitting light of an intensity proportional to the radiation image information when secondary stimulating rays are irradiated to the stimulable phosphor layer;

a laminate including a response speed converting fluorescent substance layer, which is capable of converting the light emitted by the stimulable phosphor layer into light having a life time longer than a light emission life time of the light emitted by the stimulable phosphor layer, and an electroluminescent layer capable of emitting the secondary stimulating rays, which are to be irradiated to the stimulable phosphor layer, when a voltage is applied across the electroluminescent layer; and a photo-conductor layer, which is capable of exhibiting electrical conductivity when the light having been obtained from the conversion performed by the response speed converting fluorescent substance layer is irradiated to the photo-conductor layer, the stimulable phosphor layer, the laminate, and the photo-conductor layer being overlaid one upon another in this order.

The fourth radiation image information detecting panel in accordance with the present invention may be modified such that the electroluminescent layer is a layer capable of emitting light acting as the secondary stimulating rays, which light has a pulse width sufficiently shorter than the light emission life time of the response speed converting fluorescent substance layer.

The present invention also provides a fifth radiation image information detecting panel, comprising:

a stimulable phosphor layer, which is capable of storing radiation image information, and which is capable of emitting light of an intensity proportional to the radiation image information when secondary stimulating rays are irradiated to the stimulable phosphor layer;

an electroluminescent layer capable of emitting light acting as the secondary stimulating rays, which are to be irradiated to the stimulable phosphor layer, when a voltage is applied across the electroluminescent layer, the light emitted by the electroluminescent layer having a pulse width sufficiently shorter than the light emission life time of the light emitted by the stimulable phosphor layer; and a photo-conductor layer, which is capable of exhibiting electrical conductivity when the light emitted by the stimulable phosphor layer is irradiated to the photo-conductor layer, the stimulable phosphor layer, the electroluminescent layer, and the photo-conductor layer being overlaid one upon another in this order.

Each of the fourth and fifth radiation image information detecting panels in accordance with the present invention may be modified such that the radiation image information detecting panel further comprises an optical filter layer for cutting off the secondary stimulating rays, which have been emitted by the electroluminescent layer, the optical filter layer being located between the electroluminescent layer and the photo-conductor layer.

Each of the first to fifth radiation image information detecting panels in accordance with the present invention is adapted for use in a radiation image information read-out apparatus. In such cases, the radiation image information read-out apparatus may comprise:

i) a radiation image information detecting panel in accordance with the present invention, ii) stimulating ray source control means for controlling the application of the voltage across the electroluminescent layer, such that scanning of the stimulable phosphor layer with the secondary stimulating rays may be performed, and iii) image signal acquiring means for detecting electric charges, which are generated in the photo-conductor layer in accordance with the scanning of the stimulable phosphor layer with the secondary stimulating rays, and thereby acquiring an image signal, which represents the radiation image information.

Ordinarily, the scanning of the stimulable phosphor layer with the secondary stimulating rays is performed with a line sequential scanning technique, in which the stimulable phosphor layer is scanned sequentially with linear stimulating rays. In such cases, a striped electrode, which intersects orthogonally with the line light source, may be utilized, and information representing the point of intersection of the striped electrode with the line light source may be acquired in a parallel manner. However, the scanning technique is not limited to the line sequential scanning technique described above.

The radiation image information read-out apparatus described above may be modified such that the stimulating ray source control means causes the electroluminescent layer to emit pulsed stimulating rays at predetermined time intervals, and the image signal acquiring means detects the electric charges, which are generated in the photo-conductor layer, within the predetermined time intervals after the pulsed stimulating rays have been emitted by the electroluminescent layer, and thereby acquires the image signal, which represents the radiation image information.

The first radiation image information detecting panel in accordance with the present invention is provided with the response speed converting fluorescent substance layer, which is capable of emitting the light having a life time longer than the light emission life time of the light emitted by the stimulable phosphor layer when the light emitted by the stimulable phosphor layer is irradiated to the response speed converting fluorescent substance layer. Therefore, with the first radiation image information detecting panel in accordance with the present invention, at the time of the image readout, the secondary stimulating rays, which are emitted by the electroluminescent layer, and the light, which is emitted by the stimulable phosphor layer, are capable of being separated from each other. Accordingly, a radiation image is capable of being acquired with a high signal-to-noise ratio without being affected by the secondary stimulating rays. With the first radiation image information detecting panel in accordance with the present invention, wherein the electroluminescent layer is the layer capable of emitting the light acting as the secondary stimulating rays, which light has the pulse width sufficiently shorter than the light emission life time of the response speed converting fluorescent substance layer, the secondary stimulating rays, which are emitted by the electroluminescent layer, and the light, which is emitted by the stimulable phosphor layer, are capable of being accurately separated from each other. Accordingly, a radiation image is capable of being acquired with a signal-to-noise ratio enhanced even further.

The second radiation image information detecting panel in accordance with the present invention is provided with the electroluminescent layer capable of emitting the light acting as the secondary stimulating rays, which light has the pulse width sufficiently shorter than the light emission life time of the light emitted by the stimulable phosphor layer. Therefore, with the second radiation image information detecting panel in accordance with the present invention, at the time of the image readout, the secondary stimulating rays, which are emitted by the electroluminescent layer, and the light, which is emitted by the stimulable phosphor layer, are capable of being separated from each other. Accordingly, a radiation image is capable of being acquired with a high signal-to-noise ratio without being affected by the secondary stimulating rays.

Each of the third, fourth, and fifth radiation image information detecting panels in accordance with the present invention is provided with the electroluminescent layer, which is located between the stimulable phosphor layer and the photo-conductor layer. Therefore, with each of the third, fourth, and fifth radiation image information detecting panels in accordance with the present invention, the stimulating ray source comprising the electroluminescent layer, the stimulable phosphor layer, and the photo-conductor layer are capable of being located at positions close to one another. In cases where the electroluminescent layer having the function for stimulation, the stimulable phosphor layer having the function for recording, and the photo-conductor layer having the function for detection are thus located close to one another, the spread of the stimulating rays and the spread of the light emitted by the stimulable phosphor layer are capable of being suppressed, and the image information having a high image sharpness is capable of being obtained.

The third radiation image information detecting panel in accordance with the present invention is provided with the optical filter layer for cutting off the secondary stimulating rays having been emitted by the electroluminescent layer. Therefore, with the third radiation image information detecting panel in accordance with the present invention, the problems are capable of being prevented from occurring in that the secondary stimulating rays impinge upon the photo-conductor layer. Accordingly, a radiation image is capable of being acquired with a high signal-to-noise ratio without being affected by the secondary stimulating rays.

The fourth radiation image information detecting panel in accordance with the present invention is provided with the response speed converting fluorescent substance layer, which is capable of emitting the light having a life time longer than the light emission life time of the light emitted by the stimulable phosphor layer when the light emitted by the stimulable phosphor layer is irradiated to the response speed converting fluorescent substance layer. Therefore, with the fourth radiation image information detecting panel in accordance with the present invention, at the time of the image readout, the secondary stimulating rays, which are emitted by the electroluminescent layer, and the light, which is emitted by the stimulable phosphor layer, are capable of being separated from each other. Accordingly, a radiation image is capable of being acquired with a high signal-to-noise ratio without being affected by the secondary stimulating rays. With the fourth radiation image information detecting panel in accordance with the present invention, wherein the electroluminescent layer is the layer capable of emitting the light acting as the secondary stimulating rays, which light has the pulse width sufficiently shorter than the light emission life time of the response speed converting fluorescent substance layer, the secondary stimulating rays, which are emitted by the electroluminescent layer, and the light, which is emitted by the stimulable phosphor layer, are capable of being accurately separated from each other. Accordingly, a radiation image is capable of being acquired with a signal-to-noise ratio enhanced even further.

The fifth radiation image information detecting panel in accordance with the present invention is provided with the electroluminescent layer capable of emitting the light acting as the secondary stimulating rays, which light has the pulse width sufficiently shorter than the light emission life time of the light emitted by the stimulable phosphor layer. Therefore, with the fifth radiation image information detecting panel in accordance with the present invention, at the time of the image readout, the secondary stimulating rays, which are emitted by the electroluminescent layer, and the light, which is emitted by the stimulable phosphor layer, are capable of being separated from each other. Accordingly, a radiation image is capable of being acquired with a high signal-to-noise ratio without being affected by the secondary stimulating rays.

With the radiation image information read-out apparatus, wherein each of the first to fifth radiation image information detecting panels in accordance with the present invention is employed, at the time of the image readout, the secondary stimulating rays, which are emitted by the electroluminescent layer, and the light, which is emitted by the stimulable phosphor layer, are capable of being separated from each other. Accordingly, a radiation image is capable of being acquired with a high signal-to-noise ratio without being affected by the secondary stimulating rays.

BRIEF DESCRIPTION OF THE DRAWINGS

FIG. 3 is a schematic view showing stimulating ray source control means and signal acquiring means in the radiation image information read-out apparatus of FIG. 2, FIGS. 4A, 4B, and 4C are charts showing examples of a timing, with which stimulating rays are emitted, and a timing, with which image information is acquired, FIGS. 5A and 5B are charts showing different examples of a timing, with which stimulating rays are emitted, and a timing, with which image information is acquired.

DESCRIPTION OF THE PREFERRED EMBODIMENTS

The present invention will hereinbelow be described in further detail with reference to the accompanying drawings.

Figure 1:
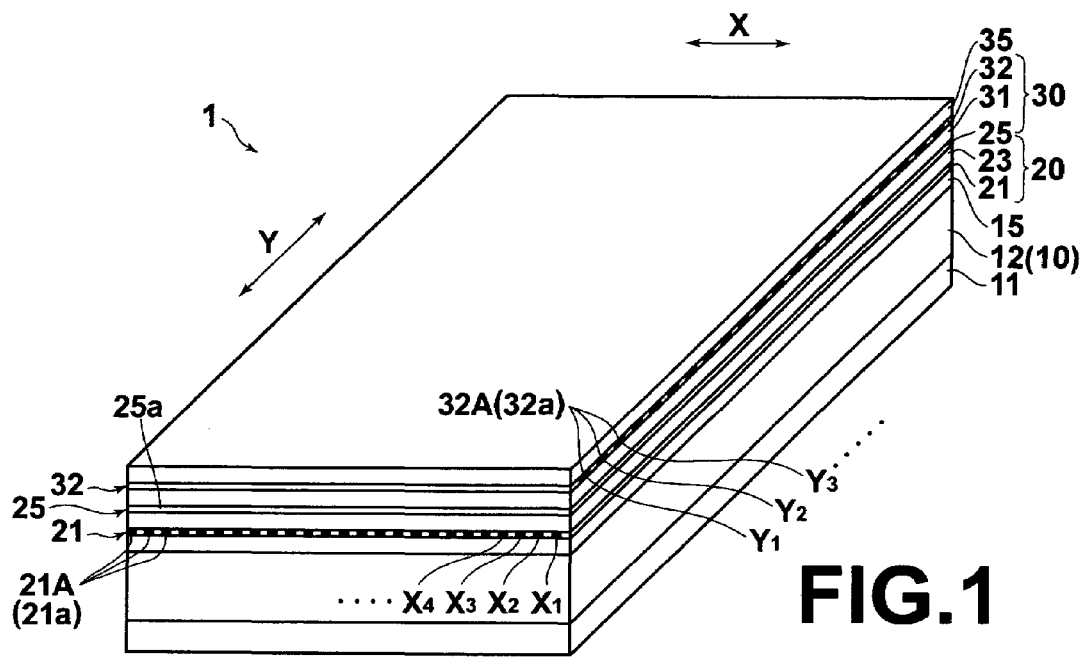
FIG. 1 is a perspective view showing a first embodiment of the radiation image information detecting panel in accordance with the present invention.

FIG. 1 is a perspective view showing a radiation image information detecting panel 1, which is a first embodiment of the radiation image information detecting panel in accordance with the present invention.

With reference to FIG. 1, the radiation image information detecting panel 1 comprises a first support (i.e., a first base) 11. The radiation image information detecting panel 1 also comprises a stimulable phosphor layer 12, which is capable of storing radiation image information, and which is capable of emitting light of an intensity proportional to the radiation image information when secondary stimulating rays are irradiated to the stimulable phosphor layer 12. The radiation image information detecting panel 1 further comprises a response speed converting fluorescent substance layer 15, which is capable of converting the light emitted by the stimulable phosphor layer 12 into light having a life time longer than a light emission life time of the light emitted by the stimulable phosphor layer 12. The radiation image information detecting panel 1 still further comprises a first electrode layer 21, which is provided with a first striped electrode 21A. The first striped electrode 21A is constituted of a plurality of linear electrodes (i.e., elements) 21a, 21a, . . . , which are arrayed in a striped pattern. The radiation image information detecting panel 1 also comprises a photo-conductor layer 23, which is capable of exhibiting electrical conductivity when the light having been obtained from the conversion performed by the response speed converting fluorescent substance layer 15 is irradiated to the photo-conductor layer 23. The radiation image information detecting panel 1 further comprises a second electrode layer 25, which is constituted of a flat plate-shaped electrode. The radiation image information detecting panel 1 still further comprises an electroluminescent layer (hereinbelow referred to as the EL layer) 31 capable of emitting the secondary stimulating rays, which are to be irradiated to the stimulable phosphor layer, when a voltage is applied across the electroluminescent layer 31. The radiation image information detecting panel 1 also comprises a third electrode layer 32, which is provided with a second striped electrode 32A. The second striped electrode 32A is constituted of a plurality of linear electrodes (i.e., elements) 32a, 32a, ..., which are arrayed in a striped pattern. The radiation image information detecting panel 1 further comprises a second support 35. The first support 11, the stimulable phosphor layer 12, the response speed converting fluorescent substance layer 15, the first electrode layer 21, the photo-conductor layer 23, the second electrode layer 25, the EL layer 31, the third electrode layer 32, and the second support 35 are overlaid one upon another in this order and combined into an integral body. Though not shown, an electrical insulation layer maybe located between the EL layer 31 and each of the second electrode layer 25 and the third electrode layer 32, which are located on opposite surface sides of the EL layer 31.

Specifically, the radiation image information detecting panel 1 comprises the first support 11. The radiation image information detecting panel 1 also comprises an image recording section 10 acting as an image recording sheet provided with the stimulable phosphor layer 12. The radiation image information detecting panel 1 further comprises a detecting section 20, which comprises the first electrode layer 21, the photo-conductor layer 23, and the second electrode layer 25. The radiation image information detecting panel 1 still further comprises a panel-shaped light source 30, which comprises the second electrode layer 25, the EL layer 31, and the third electrode layer 32. The radiation image information detecting panel 1 also comprises the second support 35. The first support 11, the image recording section 10, the detecting section 20, the panel-shaped light source 30, and the second support 35 are combined with one another into an integral body. Also, the response speed converting fluorescent substance layer 15 is located between the image recording section 10 and the detecting section 20. The second electrode layer 25 acts as both the electrode for the detecting section 20 and the electrode for the panel-shaped light source 30. Alternatively, an electrical insulation layer may be located between the detecting section 20 and the panel-shaped light source 30, and an electrode layer for the detecting section 20 and an electrode layer for the panel-shaped light source 30 may be located. In such cases, since the electrical insulation layer is located between the detecting section 20 and the panel-shaped light source 30, and since the two electrode layers are located on the opposite surface sides of the electrical insulation layer described above, the distance between the panel-shaped light source 30 and the image recording section 10 will become long, and the stimulating rays irradiated from the panel-shaped light source 30 to the stimulable phosphor layer 12 will spread. As a result, the image sharpness of the acquired image will become low. Therefore, as in this embodiment, the second electrode layer 25 should preferably be employed, which acts as both the electrode for the detecting section 20 and the electrode for the panel-shaped light source 30. However, in cases where the electrical insulation layer is located between the detecting section 20 and the panel-shaped light source 30, and the electrode layer for the detecting section 20 and the electrode layer for the panel-shaped light source 30 are located as described above, adverse effects of, for example, a voltage drop, which occurs due to an electric current flowing through the electrode layer at the time of the actuation of the EL layer 31 and a resistance to the electric current, upon the detecting section 20 are capable of being suppressed. Therefore, in cases where the radiation image information detecting panel 1 is to be used under conditions such that the phenomenon, such as the voltage drop described above, is to be eliminated, the electrical insulation layer should preferably be located between the detecting section 20 and the panel-shaped light source 30, and the electrode layer for the detecting section 20 and the electrode layer for the panel-shaped light source 30 should preferably be located as described above.

The first striped electrode 21A and the second striped electrode 32A are located such that each of the elements 21a, 21a, ... of the first striped electrode 21A and each of the elements 32a, 32a, ... of the second striped electrode 32A are approximately normal to each other, as viewed from above in FIG. 1. Each of the elements 21a, 21a, ... of the first striped electrode 21A is the linear electrode extending from one end of the radiation image information detecting panel 1 to the opposite end of the radiation image information detecting panel 1 in the direction indicated by the double headed arrow Y. The elements 21a, 21a, ... of the first striped electrode 21A are arrayed (as represented by X1, X2, X3, ... in FIG. 1) at predetermined pitches so as to stand side by side with respect to the direction indicated by the double headed arrow X. Also, each of the elements 32a, 32a, ... of the second striped electrode 32A is the linear electrode extending from one end of the radiation image information detecting panel 1 to the opposite end of the radiation image information detecting panel 1 in the direction indicated by the double headed arrow X. The elements 32a, 32a, ... of the second striped electrode 32A are arrayed (as represented by Y1, Y2, Y3, ... in FIG. 1) at predetermined pitches so as to stand side by side with respect to the direction indicated by the double headed arrow Y. The array pitches of the elements 21a, 21a, ... of the first striped electrode 21A define pixel pitches in the main scanning direction (i.e., the direction indicated by the double headed arrow X). Also, the array pitches of the elements 32a, 32a, ... of the second striped electrode 32A define the pixel pitches in the sub-scanning direction (i.e., the direction indicated by the double headed arrow Y). The same number of the elements 21a, 21a, ... of the first striped electrode 21A as a desired number of the pixels are arrayed so as to stand side by side with respect to the main scanning direction. Also, the same number of the elements 32a, 32a, ... of the second striped electrode 32A as the desired number of the pixels are arrayed so as to stand side by side with respect to the sub-scanning direction. For example, in cases where the striped electrode is constituted, such that the linear electrodes (i.e., the elements), each of which has a width of 80 μm, stand side by side in parallel at pitches of 100 μm, the pixel pitches become equal to 100 μm. Alternatively, the striped electrode may be constituted such that several linear electrodes may correspond to one pixel.

The first electrode layer 21 and the second electrode layer 25 are constituted of a material, which has transmissivity with respect to the stimulating rays emitted by the panel-shaped light source 30. Specifically, each of the elements 21a, 21a, ... of the first striped electrode 21A, which constitutes the first electrode layer 21, and a flat plated-shaped electrode 25a constituting the second electrode layer 25 maybe constituted of a known transparent electrical conductor film, such as an indium tin oxide (ITO) film, an indium-doped zinc oxide film, a thin gold film, a metal mesh electrode, or a combination of at least two materials among the above-enumerated materials. Also, the first electrode layer 21 is designed so as to have the transmissivity with respect to the light emitted by the response speed converting fluorescent substance layer 15.

The first support 11 may have a thickness falling within the range of approximately 10 µm to approximately 1,000 µm. X-rays carrying the image information are irradiated from the side of the first support 11.

The stimulable phosphor layer 12 should preferably be constituted of a CsBr:Eu acicular crystal vacuum deposited film having a thickness falling within the range of approximately 50 µm to approximately 700 µm. Alternatively, the stimulable phosphor layer 12 maybe constituted of any of other materials. However, the CsBr:Eu acicular crystal vacuum deposited film is particularly preferable for good image quality characteristics and good erasing characteristics. As another alternative, as in a second embodiment, which will be described later, the stimulable phosphor layer 12 may be replaced by a combination of an X-ray fluorescent substance layer and a stimulable phosphor layer, which is capable of being subjected to primary stimulation by the light emitted from the X-ray fluorescent substance layer and is thereby capable of storing the radiation image information. In cases where the combination of the X-ray fluorescent substance layer and the stimulable phosphor layer is thus employed, the stimulable phosphor layer, the electroluminescent layer, and the photo-conductor layer should preferably be located at positions close to one another on one side of the X-ray fluorescent substance layer. In such cases, the image sharpness of the acquired image is capable of being enhanced even further.

The photo-conductor layer 23 may be constituted of a material containing, as a principal constituent, at least one substance selected from the group consisting of a-Se (i.e., amorphous selenium), $PbI_2$, $Bi_{12}(Ge,Si)O_{20}$; perylene bis-imide (R: n-propyl), perylene bis-imide (R: n-neopentyl), and pentacene. It is necessary for the photo-conductor layer 23 to be constituted of a material having the sensitivity with respect to the light, which is emitted by the response speed converting fluorescent substance layer 15.

The response speed converting fluorescent substance layer 15 is the layer containing a fluorescent substance, which is capable of emitting the light in proportion to the quantity of the light emitted by the stimulable phosphor layer 12 when the light emitted by the stimulable phosphor layer 12 is irradiated to the fluorescent substance. The life time of the light emitted by the fluorescent substance constituting the response speed converting fluorescent substance layer 15 is longer than the light emission life time of the light emitted by the stimulable phosphor layer 12. The response speed converting fluorescent substance layer 15 may have a thickness falling within the range of approximately 2 µm to approximately 20 µm. The response speed converting fluorescent substance layer 15 may be constituted of $LaAl_{11}O_{18}:Mn^{2+}$, $La_{1-x}Al_{11(2/3)+x}O_{19}:Mn_{2+x}$ (where $0.1 \leq x \leq 0.99$), $(La,Ce)Al_{11}O_{19}:Mn^{2+}$, $(La,Ce)MgAl_{11}O_{19}:Mn^{2+}$, $YBO_3:Ce,Tb$, $ZnS:CuAl$, $BaMg_2Al_{16}O_{27}:Mn^{2+}$, $BaMgAl_{14}O_{25}:Mn^{2+}$, $BaAl_{12}O_{19}:Mn^{2+}$, $LiYF_4:Pr$, $LiYF_4:Er$, $Y_3Al_5O_{12}:Pr$, $(Ho),Y_3Al_5O_{12}:Er$, or the like. For example, with the fluorescent substance described above, which exhibits the light emission in accordance with d-d transition, or the like, blue light emitted by a CsBr:Eu stimulable phosphor is capable of being converted into green light, which has the life time longer than the light emission life time of the blue light emitted by the CsBr:Eu stimulable phosphor. In the radiation image information detecting panel in accordance with the present invention, the material constituting the response speed converting fluorescent substance layer is not limited to the materials enumerated above and may be one of various other materials, which exhibit sufficiently long light emission life times and conform to appropriate excitation spectrums and light emission spectrums. Also, the material constituting the response speed converting fluorescent substance layer is not limited to the inorganic fluorescent substances.

By way of example, as the panel-shaped light source 30, it is possible to utilize an EL device as described in, for example, a PCT International Publication No. 02/080626 pamphlet, which EL device has been formed into a panel-shaped device. Specifically, the EL layer 31 of the panel-shaped light source 30 may be constituted of a light emission layer, which contains a dielectric binder and electroluminescent light emitting particle group dispersed in the dielectric binder. The electroluminescent light emitting particle group is a group of fluorescent substance particles, a group of particles having fluorescent substance layers on surfaces of dielectric particles, a group of particles having dielectric surface-covering layers on surfaces of fluorescent substance particles, a group of particles having fluorescent substance layers and dielectric surface-covering layers, which fluorescent substance layers and dielectric surface-covering layers are formed on surfaces of dielectric particles, or a group of a combination of at least two kinds of the particles among the above-enumerated particles. The EL layer 31 is caused to emit the light by the application of the voltage between the second electrode layer 25 and the third electrode layer 32, which are located so as to sandwich the EL layer 31 therebetween. The light emitted by the EL layer 31 is utilized as the secondary stimulating rays at the time of the readout of the radiation image information. Also, the light emitted by the EL layer 31 is capable of being utilized as erasing light when energy remaining on the stimulable phosphor layer 12 after the radiation image information has been read out from the stimulable phosphor layer 12 is to be erased. The second support 35 acting as the base plate for the panel-shaped light source 30 should preferably has a thickness falling within the range of approximately 10 µm to 1,000 µm.

Besides the EL devices described above, one of the EL devices described below may be utilized for the panel-shaped light source 30.

1) A device comprising (a) a base plate, (b) a first electrode layer, which has been formed on the base plate, (c) an electrical insulation layer, which is a thick film having dielectric characteristics and has been formed with a process for jetting out particles of a material having the dielectric characteristics to the base plate provided with the first electrode layer and thereby depositing the particles of the material on the base plate provided with the first electrode layer, (d) an EL layer, which has been formed on the electrical insulation layer, and (e) a second electrode layer, which has been formed on the top of the EL layer. (The aforesaid device is described in, for example, Japanese Unexamined Patent Publication No. 2004-311422.)

2) A device comprising (a) a light emitting layer, which is constituted of the electroluminescent light emitting particle group described above, and a filling material for filling up voids among the particles of the electroluminescent light emitting particle group, and (b) an electrical insulation layer, which is located on at least one surface side of the light emitting layer, the light emitting layer and the electrical insulation layer being located between one pair of electrodes, the particles of the electroluminescent light emitting particle group being in contact with one another or fused together, a volume ratio of the electroluminescent light emitting particle group to the filling material in the light emitting layer being set to be at least 1.0. (The aforesaid device is described in, for example, Japanese Patent Application No. 2003-328355.)

3) A device comprising a light emitting layer, which is constituted of a dispersion of fluorescent substance particles containing light emission centers capable of being excited with impingement of hot electrons, which starts the light emission with an electric field intensity of at least 0.05 mV/cm, and which has a layer thickness of at most 15 μm. (The aforesaid device is described in, for example, Japanese Patent Application No. 2003-328356.)

4) A device comprising (a) a light emitting layer, which is capable of exhibiting electric field light emission, and (b) an electrical insulation layer, which is located on at least one surface side of the light emitting layer, the electrical insulation layer being a layer, which contains at least a first high dielectric particle group and a second high dielectric particle group having different average particle diameters with a packing rate of at least 70% total, and which has a layer thickness falling within the range of 0.5 μm to 20 μm, the average particle diameter of the first high dielectric particle group being at least 150 nm, the average particle diameter of the second high dielectric particle group being at most ½ of the average particle diameter of the first high dielectric particle group. (The aforesaid device is described in, for example, Japanese Patent Application No. 2003-328357.)

5) An electroluminescent device comprising a light emitting layer constituted of a dielectric binder and a plurality of electroluminescent light emitting particles dispersed in the dielectric binder, each of which electroluminescent light emitting particles contains a dielectric core and a fluorescent substance covering layer formed on the side outward from the dielectric core, wherein an average electric field intensity, which is exerted upon the fluorescent substance covering layers of the plurality of the electroluminescent light emitting particles when a voltage is applied across the electroluminescent device, becomes equal to at least 1.5 times as high as the average electric field intensity exerted upon the entire light emitting layer. (The aforesaid device is described in, for example, Japanese Patent Application No. 2004-184834.)

As the EL device, a conventional dispersion type of EL device or a conventional thin film layer type of EL device may be utilized. However, in cases where one of the devices enumerated above is utilized, the EL device exhibiting a luminance higher than the luminance obtained with the conventional EL devices is capable of being obtained. In such cases, since the light having a high luminance is capable of being utilized as the secondary stimulating rays, an image having a high image sharpness is capable of being acquired. Also, in cases where the panel-shaped light source provided with the device capable of emitting the light having a high luminance is utilized as an erasing light source, which will be described later, the erasing efficiency is capable of being enhanced. Further, an organic EL device is efficient for its capability of emitting pulsed light having a markedly short pulse width.

However, as the EL layer 31 of the panel-shaped light source 30, an EL layer having a light emission life time of at most 100 μs should preferably be utilized, and an EL layer having a light emission life time of at most 30 μs should more preferably be utilized. In order for the EL layer having the light emission life time described above to be formed, for example, a (Ca, Sr) S:Eu fluorescent substance may be employed as the fluorescent substance contained in the electroluminescent light emitting particles. The light emission life time of the (Ca, Sr)S:Eu fluorescent substance is approximately $\tau_0=40$ ns.

By way of example, in cases where the light emission life time of the EL layer is equal to 100 μs, a period of 2.8 ms will be required for the intensity of the light emitted by the EL layer to become low by 12 orders of ten (exponential function-like attenuation being assumed: $(1/e)^{28}=7\times 10^{-13}$). In cases where the EL layer of the type described above is utilized, the detection of the electric current flowing through the photo-conductor layer may be started at the stage, at which the intensity of the stimulating rays has become low by approximately 12 orders of ten, and may be continued for a period of time approximately two times as long as the period of time required for the intensity of the stimulating rays to become low by 12 orders of ten. In such cases, it is necessary for the light emission to be continued for a period of time of approximately 2.8×3. Therefore, it is necessary for the light emission life time of the response speed converting fluorescent substance layer to be equal to at least approximately 80 times (2.8/0.1×3=84) as long as the light emission life time of the EL layer.

Also, in cases where the detection of the electric current flowing through the photo-conductor layer is started at the stage, at which the intensity of the stimulating rays has become low by approximately 12 orders of ten, and a period of time approximately two times as long as the period of time required for the intensity of the stimulating rays to become low by 12 orders of ten is required as the current detection time, a period of time of 2.8×3 will be required for the readout with respect to one line (extending along the main scanning direction); and a period of time of 34 s will be required for the readout with respect to 4,000 lines (i.e., with respect to an image constituted of 4,000 pixels arrayed in the sub-scanning direction). Similarly, in cases where the light emission life time of the EL layer is equal to 30 μs, a period of time of approximately 10 s will be required for the readout with respect to one image. In cases where the light emission life time of the EL layer is equal to 3 μs, a period of time of approximately 1 s will be required for the readout with respect to one image. In cases where the light emission life time of the EL layer is equal to 300 ns, a period of time of approximately 0.1 s will be required for the readout with respect to one image. In cases where the light emission life time of the EL layer is equal to 30 ns, a period of time of approximately 0.01 s will be required for the readout with respect to one image.

The examples described above serve for explaining how a combination of the EL layer and the response speed converting fluorescent substance is to be selected. The examples, in which the intensity of the light emitted by the EL layer becomes low by approximately 12 orders of ten, and in which the current detection time is set to be approximately two times as long as the period of time required for the intensity of the light emitted by the EL layer to become low by 12 orders of ten, may be altered when necessary.

As described above, the radiation image information detecting panel 1, which is the first embodiment of the radiation image information detecting panel in accordance with the present invention, is provided with the response speed converting fluorescent substance layer 15, which is capable of emitting the light having a life time longer than the light emission life time of the light emitted by the stimulable phosphor layer 12 when the light emitted by the stimulable phosphor layer 12 is irradiated to the response speed converting fluorescent substance layer 15. Therefore, with the radiation image information detecting panel 1, at the time of the image readout, the secondary stimulating rays, which are emitted by the electroluminescent layer 31, and the light, which is emitted by the stimulable phosphor layer 12, are capable of being separated from each other. Accordingly, a radiation image is capable of being acquired with a high signal-to-noise ratio without being affected by the secondary stimulating rays. Also, in cases where the electroluminescent layer 31 is constituted of a material capable of emitting the light acting as the secondary stimulating rays, which light has the pulse width sufficiently shorter than the light emission life time of the response speed converting fluorescent substance layer 15, the secondary stimulating rays, which are emitted by the electroluminescent layer 31, and the light, which is emitted by the stimulable phosphor layer 12, are capable of being accurately separated from each other. Accordingly, a radiation image is capable of being acquired with a signal-to-noise ratio enhanced even further.

Also, the order, in which the image recording section 10 provided with the stimulable phosphor layer 12, the response speed converting fluorescent substance layer 15, and the detecting section 20 provided with the photo-conductor layer 23 are overlaid one upon another, is not limited to the order employed in the embodiment described above and maybe altered arbitrarily. Further, the panel-shaped light source 30 may be located between the image recording section 10 and the detecting section 20.

Figure 2:
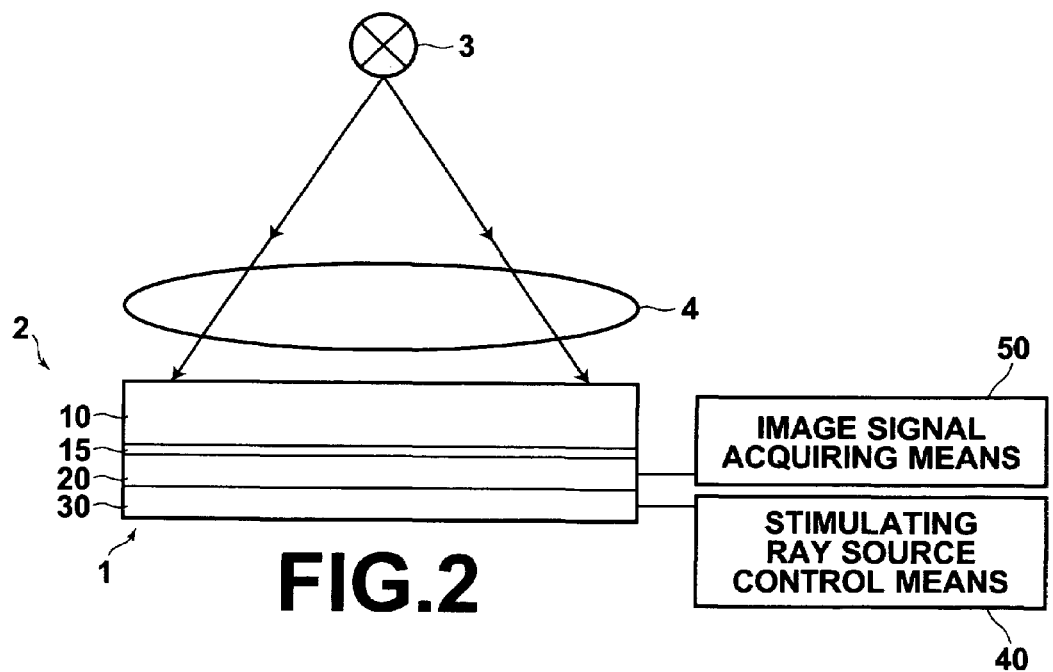
FIG. 2 is a schematic view showing a radiation image information read-out apparatus, in which the radiation image information detecting panel of FIG. 1 is employed.

FIG. 2 schematically shows a radiation image information read-out apparatus 2, which is provided with the radiation image information detecting panel 1 described above. FIG. 3 is a schematic view showing stimulating ray source control means and signal acquiring means in the radiation image information read-out apparatus 2 of FIG. 2.

The radiation image information read-out apparatus 2 comprises the radiation image information detecting panel 1 shown in FIG. 1. The radiation image information read-out apparatus 2 also comprises stimulating ray source control means 40 for controlling the panel-shaped light source 30. The radiation image information read-out apparatus 2 further comprises image signal acquiring means 50 for controlling the detecting a section 20. Though not shown clearly, the radiation image information read-out apparatus 2 is capable of being utilized in a simple manner as a cassette type of apparatus, which accommodates the radiation image information detecting panel 1 therein. At the time of the radiation imaging operation, the image recording operation, the image read-out operation, and the erasing operation may be performed in the manner interlocked with a radiation source and an image recording base. Alternatively, as in the cases of a cassette, which is loaded with a conventional stimulable phosphor sheet and is not provided with a detecting section and a panel-shaped light source, the radiation imaging operation may be performed such that the operation is not interlocked with the radiation source and the image recording base.

As illustrated in FIG. 3, the stimulating ray source control means 40 applies a predetermined voltage between the second electrode layer 25 and the third electrode layer 32. Specifically, the stimulating ray source control means 40 applies the predetermined voltage between the second electrode layer 25 and each of the elements 32a, 32a, . . . of the third electrode layer 32. Alternatively, the stimulating ray source control means 40 may apply the predetermined voltage between the second electrode layer 25 and a group of several elements, which are among the elements 32a, 32a, . . . of the third electrode layer 32, simultaneously. As another alternative, the stimulating ray source control means 40 may apply the predetermined voltage between the second electrode layer 25 and all of the elements 32a, 32a, . . . of the third electrode layer 32 simultaneously. The stimulating ray source control means 40 comprises an actuating electric power source section 41 for outputting an a.c. pulsed actuating voltage. The stimulating ray source control means 40 also comprises switching means 42 for switching over the elements 32a, 32a, . . . , to which the actuating voltage outputted from the actuating electric power source section 41 is to be applied. A flat plate-shaped electrode 25a, which constitutes the second electrode layer 25, is grounded.

The electrical connection of the third electrode layer 32 and the actuating electric power source section 41 with each other is controlled by the switching means 42. The switching means 42 is electrically connected to the actuating electric power source section 41. The switching means 42 is provided with switches 42a, 42a, . . . each of which is connected to one of the elements 32a, 32a, . . . of the second striped electrode 32A constituting the third electrode layer 32. With on-off operations of each switch 42a, the electrical connection of the corresponding element 32a and the actuating electric power source section 41 to each other is controlled.

At the time of the image readout, the switching means 42 operates such that the elements 32a, 32a, . . . , which are arrayed so as to stand side by side with respect to the sub-scanning direction (i.e., with respect to the direction indicated by the double headed arrow Y in FIG. 3), are successively subjected to the electrical connection with the actuating electric power source section 41. Specifically, the switching means 42 operates such that the elements 32a, 32a, . . . are successively connected with the actuating electric power source section 41 in the order represented by Y1, Y2, Y3, . . . in FIG. 3. In this manner, the actuating voltage outputted from the actuating electric power source section 41 is successively applied to the elements 32a, 32a, . . . , which are arrayed so as to stand side by side with respect to the direction indicated by the arrow Y in FIG. 3. As a result, the light (the line light) is emitted by a region of the EL layer 31, which region is sandwiched between each of the elements 32a, 32a, . . . and the flat plate-shaped electrode 25a constituting the second electrode layer 25, such that the line light performs the scanning with respect to the sub-scanning direction indicated by the double headed arrow Y.

The image signal acquiring means 50 comprises voltage applying means 53. The voltage applying means 53 is provided with an electric power source 51 for applying a predetermined voltage between the first electrode layer 21 and the second electrode layer 25, which are located on the opposite surface sides of the photo-conductor layer 23, such that an electric field may occur in the photo-conductor layer 23. The voltage applying means 53 is also provided with a switch 52. The image signal acquiring means 50 also comprises current detecting means 56. The current detecting means 56 is provided with a plurality of current detecting amplifiers 55, 55, . . . , each of which is connected with one of the elements 21a, 21a, . . . of the first striped electrode 21A.

The voltage applying means 53 receives an instruction from control means (not shown). In accordance with the received instruction, the voltage applying means 53 connects (i.e., turns on) the switch 52 for a predetermined period of time between when the emission of the stimulating rays has been performed and when the next emission of the stimulating rays is started. A d.c. voltage is thus applied between the first electrode layer 21 and the second electrode layer 25 for the predetermined period of time.

The current detecting means 56 detects the electric current, which flows through each of the elements 21a, 21a, . . . , in a parallel manner with respect to each of the elements 21a, 21a, . . . The second electrode layer 25 is connected via the switch 52 to a negative pole of the electric power source 51. A positive pole of the electric power source 51 is connected to each of the current detecting amplifiers 55, 55, .... When the light, which is emitted by the response speed converting fluorescent substance layer 15 due to the irradiation of the light emitted by the stimulable phosphor layer 12 to the response speed converting fluorescent substance layer 15, impinges upon the photo-conductor layer 23, the electric charges are generated in the photo-conductor layer 23. Each of the current detecting amplifiers 55, 55, ... detects the electric current occurring due to the electric charges, which are thus generated in the photo-conductor layer 23. The current detecting amplifiers 55, 55, ... thus have the function for acquiring the image signal in accordance with the energy having been stored on the stimulable phosphor layer 12. As the constitution of each of the current detecting amplifiers 55, 55, ..., one of various known constitutions may be employed. In accordance with the constitution of each of the current detecting amplifiers 55, 55, ..., the manner of the connection of the electric power source 51 and the switch 52, and the like, may be altered.

The timing, with which the switch 52 of the voltage applying means 53 is turned on and off, is controlled by control means (not shown), such that the electric charges, which are caused to occur in the photo-conductor layer 23 by the stimulating rays radiated out from the panel-shaped light source 30, may not be detected, and such that the electric charges, which occur in the photo-conductor layer 23 in accordance with the light emitted by the stimulable phosphor layer 12 exposed to the stimulating rays, may be detected.

How the radiation image information is recorded on the image recording section 10 of the radiation image information detecting panel 1 in the radiation image information read-out apparatus 2 having the constitution described above, and how the radiation image information having been recorded on the image recording section 10 is read out will be described hereinbelow.

Firstly, in cases where the operation for recording the radiation image information is to be performed, the radiation image information detecting panel 1 is located such that the side of the first support 11 of the radiation image information detecting panel 1 may stand facing an object 4.

Thereafter, the radiation, such as the X-rays, is irradiated from a radiation source 3 to the object 4. The radiation carrying the radiation image information of the object 4, i.e., the radiation having passed through the object 4 in the cases of FIG. 2, passes through the first support 11 and impinges upon the stimulable phosphor layer 12. The stimulable phosphor layer 12 having thus been exposed to the radiation stores energy in proportion to the quantity of the radiation impinging upon the stimulable phosphor layer 12. In this manner, the radiation image information of the object 4 is recorded on the image recording section 10. In lieu of the radiation (acting as the recording light) being irradiated from the side of the first support 11, the recording light may be irradiated from the side of the second support 35 of the radiation image information detecting panel 1. However, if the recording light is irradiated from the side of the second support 35 of the radiation image information detecting panel 1, since the recording light impinges upon the stimulable phosphor layer 12 via the second striped electrode 32A of the panel-shaped light source 30 and the first striped electrode 21A of the first electrode layer 21, there will be the risk that the problems with regard to an artifact due to the electrode matrixes will occur. Therefore, the recording light should preferably be irradiated from the side of the first support 11 as in this embodiment.

In cases where the radiation image information having been stored on the image recording section 10 is to be read out from the image recording section 10, the stimulating ray source control means 40 successively changes over the elements 32a, 32a, ... of the second striped electrode 32A successively with respect to the sub-scanning direction indicated by the double headed arrow Y and applies the predetermined voltage between each of the elements 32a, 32a, ... and the flat plate-shaped electrode 25a of the second electrode layer 25. With the application of the voltage, EL light is emitted from the region of the EL layer 31, which region is sandwiched between each of the elements 32a, 32a, ... and the flat plate-shaped electrode 25a. Each of the elements 32a, 32a, ... is the linear element, which extends from one end of the radiation image information detecting panel 1 to the opposite end of the radiation image information detecting panel 1 along the main scanning direction indicated by the double headed arrow X. Therefore, the EL light is capable of being utilized as the linear stimulating rays. Specifically, the panel-shaped light source 30 is equivalent to a light source, which is constituted of a plurality of linear light sources arrayed in a surface-shaped form. In cases where the elements 32a, 32a, ... are thus successively changed over for causing the EL light to be emitted from the panel-shaped light source 30, the stimulable phosphor layer 12 is capable of being scanned with the linear stimulating rays, which extend in the main scanning direction indicated by the double headed arrow X, in the sub-scanning direction indicated by the double headed arrow Y.

The stimulating rays, which have been emitted from the panel-shaped light source 30 impinges upon the stimulable phosphor layer 12 via the detecting section 20 and the response speed converting fluorescent substance layer 15. When the stimulable phosphor layer 12 is exposed to the stimulating rays, the stimulable phosphor layer 12 is caused by the stimulating rays to emit blue light. The emitted blue light impinges upon the response speed converting fluorescent substance layer 15. When the response speed converting fluorescent substance layer 15 is exposed to the blue light emitted by the stimulable phosphor layer 12, the response speed converting fluorescent substance layer 15 is caused by the emitted blue light to produce green fluorescence, which has a life time longer than the light emission life time of the emitted blue light. The green fluorescence having thus been produced by the response speed converting fluorescent substance layer 15 impinges upon the photo-conductor layer 23. When the photo-conductor layer 23 is exposed to the fluorescence, the photo-conductor layer 23 is caused by the fluorescence to generate pairs of positive and negative charges. In the foregoing, as an aid in facilitating the explanation, the stimulable phosphor layer 12 is set so as to emit the blue light, and the response speed converting fluorescent substance layer 15 is set so as to produce the green fluorescence. However, no limitation is imposed upon the color of the emitted light and the color of the produced fluorescence.

Figure 4A:
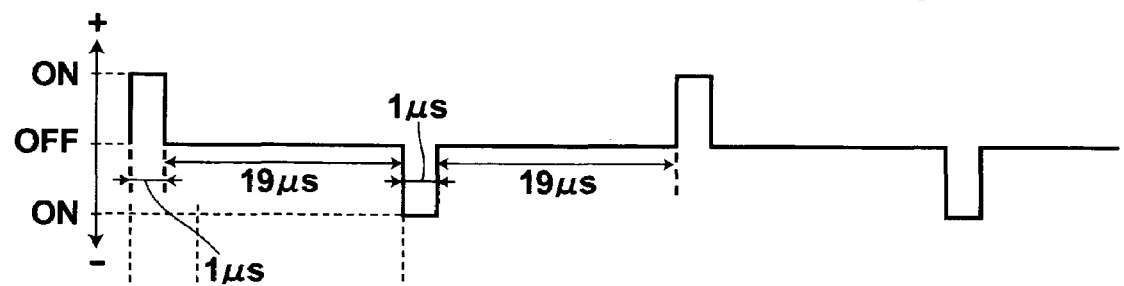
Figure 4B:
Figure 4C:
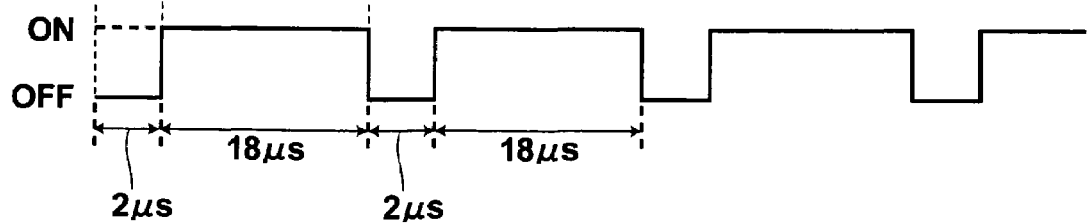

As the actuating voltage applied between the flat plate-shaped electrode 25a and each of the elements 32a, 32a, ..., a pulsed rectangular wave voltage having predetermined positive and negative pulse widths is employed. The switch 52 of the image signal acquiring means 50 is turned on with the timing, with which the actuating voltage applied to the panel-shaped light source 30 is being of the 0 level. FIGS. 4A, 4B, and 4C show examples of the timing, with which the panel-shaped light source 30 is turned on and off by the stimulating ray source control means 40, and the timing, with which the electric charge detection with the image detecting means is turned on and off. The timings illustrated in FIGS.

4A, 4B, and 4C will be described later in detail. When the switch 52 is turned on, the electric field is applied to the photo-conductor layer 23. Therefore, of the pairs of the positive and negative charges having been generated in the photo-conductor layer 23, the negative charges move toward the flat plate-shaped electrode 25a, and the positive charges move toward the side of the elements 21a, 21a, . . . of the first striped electrode 21A constituting the first electrode layer 21.

As described above, each of the current detecting amplifiers 55, 55, . . . of the current detecting means 56 is connected with one of the elements 21a, 21a, . . . of the first striped electrode 21A constituting the first electrode layer 21. Therefore, the electric current detection is performed simultaneously with respect to the main scanning direction indicated by the double headed arrow X, which direction is the array direction of the elements 21a, 21a, . . . In accordance with the sub-scanning with the stimulating rays, i.e. in accordance with the successive change-over of the elements 32a, 32a, . . . performed by the switching means 42, the electric currents, which occur successively with respect to the sub-scanning direction indicated by the double headed arrow Y due to the movements of the electric charges, are detected, and an image signal representing the radiation image information is thereby obtained.

Actually, after the image read-out operation has been performed on the stimulable phosphor layer 12, the energy having been stored on the stimulable phosphor layer 12 is not perfectly converted into the emitted light, and residual energy remains on the stimulable phosphor layer 12. In such cases, if the next image recording operation is performed on the stimulable phosphor layer 12, on which the residual energy remains, the residual energy will be added to the energy, which is stored on the stimulable phosphor layer 12 in accordance with the next radiation image information, and the problems, such as a residual image phenomenon and lowering of the signal-to-noise ratio, will occur at the time of the next image read-out operation.

Therefore, at the stage between the completion of the image read-out operation on the stimulable phosphor layer 12 and the start of the next image recording operation on the stimulable phosphor layer 12, predetermined light acting as the erasing light is irradiated to the stimulable phosphor layer 12, and the residual energy remaining on the stimulable phosphor layer 12 is thereby released.

With the radiation image information read-out apparatus 2, the panel-shaped light source 30 is capable of being utilized as the erasing light source for producing the erasing light. Specifically, a predetermined voltage is applied simultaneously between the plurality of the elements 32a, 32a, . . . of the second striped electrode 32A and the flat plate-shaped electrode 25a of the second electrode layer 25. At this time, with the voltage application, the light emitted by the EL layer 31 maybe approximately uniformly irradiated to the stimulable phosphor layer 12. In cases where the panel-shaped light source 30 is thus utilized for producing both the stimulating rays and the erasing light, the number of parts of the radiation image information read-out apparatus 2 is capable of being kept small, and the cost of the radiation image information read-out apparatus 2 is capable of being kept low.

Examples of the timing, with which the pulsed stimulating rays are emitted by the panel-shaped light source 30 at the time of the image read-out operation, the timing, with which the fluorescence is produced by the response speed converting fluorescent substance layer 15, and the timing, with which the detection of the electric charges is performed, will be described hereinbelow with reference to FIGS. 4A, 4B, and 4C.

FIG. 4A shows an example of alteration of the panel-shaped light source actuating voltage with the passage of time. FIG. 4B shows an example of alteration of the intensity of the fluorescence, which is produced by the response speed converting fluorescent substance layer 15, with the passage of time. FIG. 4C shows an example of alteration of the state of the electric charge detection with the passage of time.

In the examples illustrated in FIGS. 4A, 4B, and 4C, an EL layer constituted of a (Ca, Sr) S:Eu fluorescent substance, which has a light emission life time of $\tau_0=40$ ns (i.e., 40 nanoseconds), is utilized. Also, a rectangular wave pulsed actuating voltage, which has a positive pulse width of 1 μs (i.e., 1 microsecond) and a negative pulse width of 1 μs at 25 kHz, is applied to the panel-shaped light source 30. Further, a fluorescent substance $(Y_3Al_5O_{12}:Er)$ having a light emission life time of $\tau_1=16$ μs is utilized as the response speed converting fluorescent substance.

In cases where the rectangular wave pulsed actuating voltage as illustrated in FIG. 4A is applied to the panel-shaped light source 30, actually, the light emitted by the EL layer 31 does not have a rectangular intensity pattern. In such cases, ordinarily, the intensity of the light emitted by the EL layer 31 exhibits exponential function-like attenuation. Therefore, in this example, at a stage, at which a predetermined period of time (in this case, 1 μs) has elapsed after the application of each of the pulses of the actuating voltage has been completed, the detection of the electric current is started. In this manner, the adverse effect of the stimulating rays (i.e., the detection of the electric charges occurring in the photo-conductor layer 23 due to the stimulating rays) is suppressed. In this example, the rectangular wave pulsed actuating voltage, which has the positive pulse width of 1 μs and the negative pulse width of 1 μs at 25 kHz, is applied to the panel-shaped light source 30, and the EL light is thereby emitted by the EL layer 31. At this time, the intensity of the fluorescence, which is produced by the response speed converting fluorescent substance layer 15 in accordance with the intensity of the light emitted by the stimulable phosphor layer 12, alters with the passage of time in the pattern as illustrated in FIG. 4B.

In the examples illustrated in FIGS. 4A, 4B, and 4C, in cases where the time, at which the application of each of the pulses of the actuating voltage is started, is taken as 0, the period of time, during which the corresponding electric current is detected from the photo-conductor layer 23, is set to be 18 μs, which occurs from a stage of 2 μs to a stage of 20 μs. Also, one period from the start of the application of each of the pulses of the actuating voltage to the end of the detection of the corresponding electric current is set to be 20 μs. The electric current, which is detected during the one period, takes a value corresponding to an integrated value of the intensities of the part of the fluorescence produced by the response speed converting fluorescent substance layer 15, which part is hatched in FIG. 4B.

The alteration of the fluorescence intensity with the passage of time, which fluorescence intensity corresponds to the intensity of the light emitted by the stimulable phosphor layer 12, may be represented by the formula $I(t)=a \cdot \exp(-t/\tau_1)$. In such cases, in the examples illustrated in FIGS. 4A, 4B, and 4C, the integrated value of the intensities of the fluorescence detected during one period (i.e., the intensities of the part of the fluorescence produced by the response speed converting fluorescent substance layer 15, which part is hatched in FIG. 4B) has the relationship with respect to the integrated value of the intensities of the entire fluorescence, which relationship is represented by the formula shown below.

$$I = \int_2^{20} a \cdot \exp(-t/16)\,dt \bigg/ \int_0^{\infty} a \cdot \exp(-t/16)\,dt = 0.59$$

The value representing the relationship described above has the meaning equivalent to the light transmittance of a stimulating ray separating filter with respect to the light emitted by a stimulable phosphor sheet in a conventional radiation image information read-out apparatus. In the conventional radiation image information read-out apparatus, the stimulating ray separating filter is located for separating the secondary stimulating rays and the light emitted by the stimulable phosphor sheet, which impinge upon a light guiding optical system at the time of the image readout from the stimulable phosphor sheet, from each other.

As described above, the one period from the start of the application of each of the pulses of the actuating voltage to the end of the detection of the corresponding electric current may be set to be 20 μs. Also, in order for the signal-to-noise ratio to be enhanced, the electric current detection may be performed for 10 pulses (i.e., for 10 periods) with respect to one line (extending along the main scanning direction). Further, 4,000 lines may stand side by side with respect to the sub-scanning direction. In such cases, the formula shown below obtains.

20 μs×10×4000=0.8 s

Therefore, a period of time of approximately 0.8 second is required for the image readout to be performed with respect to one image. In this example, as described above, the electric current detection is performed for 10 pulses (i.e., for 10 periods) with respect to one line (extending along the main scanning direction). However, the electric current detection need not necessarily be performed for 10 pulses (i.e.; for 10 periods) with respect to one line. In cases where the detection of the electric charges is capable of being performed sufficiently with one pulse, the detection may be performed for only one pulse with respect to one line.

Different examples of the timing, with which the pulsed stimulating rays are emitted by the panel-shaped light source 30 at the time of the image read-out operation, the timing, with which the fluorescence is produced by the response speed converting fluorescent substance layer 15, and the timing, with which the detection of the electric charges is performed, will be described hereinbelow with reference to FIGS. 5A and 5B.

FIG. 5A shows a different example of alteration of the panel-shaped light source actuating voltage with the passage of time. FIG. 5B shows a different example of alteration of the state of the electric charge detection with the passage of time.

In the examples illustrated in FIGS. 5A and 5B, a sine wave actuating voltage at 50 kHz is applied to the EL layer 31. Also, 30 pulses of the pulsed actuating voltage are collectively applied with respect to one line. The electric charges, which occur in the photo-conductor layer 23 in accordance with the light emitted by the stimulable phosphor layer 12 with the stimulating rays corresponding to the 30 pulses, are detected. In the examples, a fluorescent substance (LiYF$_4$:Er) having a light emission life time of $\tau_1$=400 μs is employed as the response speed converting fluorescent substance.

In the examples illustrated in FIGS. 5A and 5B, in cases where the time, at which the application of the pulsed actu-ating voltage is started, is taken as 0, the period of time, during which the corresponding electric current is detected from the photo-conductor layer 23, is set to be 560 μs, which occurs from a stage of 40 μs to a stage of 600 μs. Also, one period from the start of the application of the pulsed actuating voltage to the end of the detection of the corresponding electric current is set to be 600 μs.

The alteration of the fluorescence intensity with the passage of time, which fluorescence intensity corresponds to the intensity of the light emitted by the stimulable phosphor layer 12, may be represented by the formula I(t)=a·exp(−t/$\tau_1$). In such cases, in the examples illustrated in FIGS. 5A and 5B, the integrated value of the intensities of the fluorescence detected during one period has the relationship with respect to the integrated value of the intensities of the entire fluorescence, which relationship is represented by the formula shown below.

$$I = \int_{40}^{600} a \cdot \exp(-t/400)\,dt \bigg/ \int_0^{\infty} a \cdot \exp(-t/400)\,dt = 0.68$$

The value representing the relationship described above has the meaning equivalent to the light transmittance of the stimulating ray separating filter with respect to the light emitted by the stimulable phosphor sheet in the conventional radiation image information read-out apparatus. In the conventional radiation image information read-out apparatus, the stimulating ray separating filter is located for separating the secondary stimulating rays and the light emitted by the stimulable phosphor sheet, which impinge upon the light guiding optical system at the time of the image readout from the stimulable phosphor sheet, from each other.

The calculation shown above is based upon the assumption that the emission of the light emitted by the stimulable phosphor layer 12 will rise instantaneously and will thereafter attenuates in accordance with an exponential function. However, actually, the rise of the emission of the light emitted by the stimulable phosphor layer 12 is delayed, and therefore the attenuation time is delayed. Accordingly, an efficiency higher than the value described above is capable of being obtained.

As described above, the one period from the start of the application of the pulsed actuating voltage to the end of the detection of the corresponding electric current may be set to be 600 μs. Also, 4,000 lines may stand side by side with respect to the sub-scanning direction. In such cases, the formula shown below obtains.

600 μs×4000=2.4 s

Therefore, a period of time of approximately 2.4 seconds is required for the image readout to be performed with respect to one image.

The number of the pulses of the pulsed actuating voltage, which pulses are applied collectively to the EL layer 31, may be set arbitrarily in accordance with the EL actuating frequency, the light emission life time of the response speed converting fluorescent substance, the readout time, and the like.

In the first embodiment described above, the second electrode layer 25, which acts as the common electrode for both the panel-shaped light source 30 and the detecting section 20, is constituted of the flat plate-shaped electrode 25a. Alternatively, an electrical insulation layer maybe located between the panel-shaped light source 30 and the detecting section 20, and an electrode layer for the panel-shaped light source 30 and an electrode layer for the detecting section 20 may be located as two independent electrode layers. In such cases, the electrode layer for the panel-shaped light source 30 and the electrode layer for the detecting section 20 may be of a combination of striped electrodes, which stand facing each other, or may be a combination of a striped electrode and a flat plate-shaped electrode, which stand facing each other. The directions of the stripes may be approximately normal to each other, as viewed from above.

Also, in cases where the electrode layer for the panel-shaped light source 30 and the electrode layer for the detecting section 20 are located as two independent electrode layers in the manner described above, it is necessary for the current detecting circuit described above to be altered appropriately.

Figure 6:
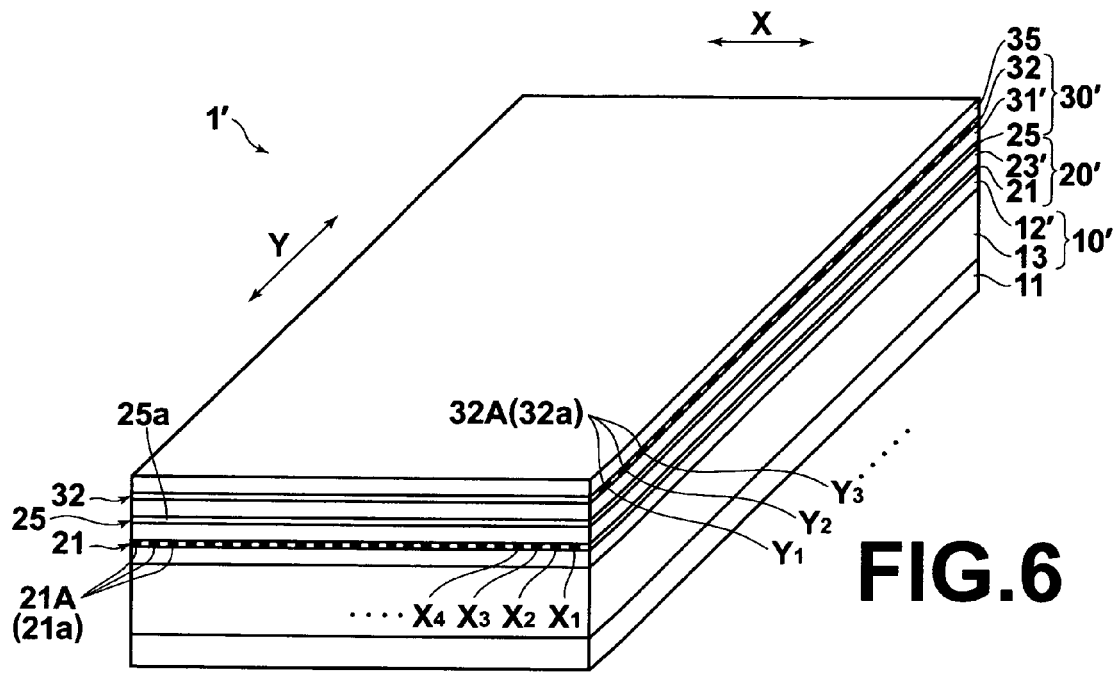
FIG. 6 is a perspective view showing a second embodiment of the radiation image information detecting panel in accordance with the present invention.

A second embodiment of the radiation image information detecting panel in accordance with the present invention will be described hereinbelow. FIG. 6 is a perspective view showing a radiation image information detecting panel 1', which is the second embodiment of the radiation image information detecting panel in accordance with the present invention. In FIG. 6, similar elements are numbered with the same reference numerals with respect to FIG. 1.

With reference to FIG. 6, the radiation image information detecting panel 1' comprises the first support 11. The radiation image information detecting panel 1' also comprises an image recording section 10', which is constituted of an X-ray fluorescent substance layer 13 and a stimulable phosphor layer 12' overlaid one upon the other, and which acts as a sensitized type of image recording sheet. The radiation image information detecting panel 1' further comprises a detecting section 20', which is constituted of the first electrode layer 21, a photo-conductor layer 23', and the second electrode layer 25. The photo-conductor layer 23' is capable of exhibiting the electrical conductivity when the light emitted by the stimulable phosphor layer 12' is irradiated to the photo-conductor layer 23'. The radiation image information detecting panel 1' still further comprises a panel-shaped light source 30', which is constituted of the second electrode layer 25, an EL layer 31', and the third electrode layer 32. The EL layer 31' is capable of emitting the light acting as the secondary stimulating rays, which are to be irradiated to the stimulable phosphor layer 12', when a voltage is applied across the EL layer 31', the light emitted by the EL layer 31' having a pulse width sufficiently shorter than the light emission life time of the light emitted by the stimulable phosphor layer 12'. The radiation image information detecting panel 1' also comprises the second support 35. The first support 11, the image recording section 10', the detecting section 20', the panel-shaped light source 30', and the second support 35 are combined into an integral body. The material for constituting the stimulable phosphor layer 12' and the material for constituting the EL layer 31' are selected from a combination of the materials, such that the pulse width of the light emitted by the EL layer 31' may be sufficiently shorter than the light emission life time of the light emitted by the stimulable phosphor layer 12'.

By way of example, as the combination of the material for constituting the stimulable phosphor layer 12' and the material for constituting the EL layer 31', a combination of a stimulable phosphor, which has been activated with $Mn^{2+}$, $Tb^{3+}$, or the like, and has a long light emission life time, and an EL fluorescent substance, which has been activated with $Eu^{2+}$, or the like, and has a short light emission lifetime, such as a (Ca.Sr)S:Eu fluorescent substance, maybe employed. Also, the combination of the X-ray fluorescent substance and the stimulable phosphor utilized in the second embodiment maybe replaced by the stimulable phosphor as in the first embodiment, which stimulable phosphor has both the function of the X-ray fluorescent substance of the X-ray fluorescent substance layer 13 and the function of the stimulable phosphor of the stimulable phosphor layer 12'. However, in such cases, the combination of the stimulable phosphor and the EL fluorescent substance should be selected from the combinations of the materials, such that the pulse width of the light emitted by the EL layer 31' is sufficiently shorter than the light emission life time of the light emitted by the stimulable phosphor layer 12'.

In cases where the combination of the stimulable phosphor and the EL fluorescent substance is selected from the combinations of the materials, such that the pulse width of the light emitted by the EL layer 31' is sufficiently shorter than the light emission life time of the light emitted by the stimulable phosphor layer 12', as in the cases of the aforesaid first embodiment in which the response speed converting fluorescent substance layer 15 is utilized, the electric charges having been generated in the photo-conductor layer 23' due to the irradiation of the light, which is emitted by the stimulable phosphor layer 12' when the stimulable phosphor layer 12' is exposed to the EL light, are capable of being detected after the emission of each of the pulses of the EL light has been completed. Therefore, the EL light emitted as the secondary stimulating rays by the EL layer 31' and the light emitted by the stimulable phosphor layer 12' are capable of being separated from each other, and a radiation image, which has a high signal-to-noise ratio and is free from adverse effect of the secondary stimulating rays, is capable of being acquired. Specifically, the term "sufficiently shorter than a light emission life time of light emitted by a stimulable phosphor layer" as used herein means that the pulse width of the EL light is shorter than the life time of the light emitted by the stimulable phosphor layer 12', such that the electric charges having been generated in the photo-conductor layer 23' due to the irradiation of the light, which is emitted by the stimulable phosphor layer 12' when the stimulable phosphor layer 12' is exposed to the EL light, are capable of being detected sufficiently after the emission of each of the pulses of the EL light has been completed, and such that the image signal is thus capable of being acquired. The timing, with which the secondary stimulating rays are emitted, and the timing, with which the detection of the electric charges is performed, may be set approximately in the same manner as that in the first embodiment described above. In this case, the alteration of the intensity of the fluorescence, which is produced by the response speed converting fluorescent substance layer 15, with the passage of time as illustrated in FIG. 4B may be replaced by the alteration of the intensity of the light, which is emitted by the stimulable phosphor layer 12'.

Also, the order, in which the image recording section 10' provided with the stimulable phosphor layer 12' and the X-ray fluorescent substance layer 13, and the detecting section 20' provided with the photo-conductor layer 23' are overlaid one upon the other, is not limited to the order employed in the second embodiment described above and maybe altered arbitrarily. For example, the image recording section 10' may be located between the detecting section 20' and the panel-shaped light source 30'. Further, the panel-shaped light source 30' may be located between the image recording section 10' and the detecting section 20'.

The electrode constitutions at the detecting section 20' and the panel-shaped light source 30' of the radiation image information detecting panel 1' in the second embodiment are identical with the electrode constitutions at the detecting section 20 and the panel-shaped light source 30 in the aforesaid first embodiment. Therefore, in cases where the radiation image information detecting panel 1' is to be utilized in a radiation image information read-out apparatus, the radiation image information read-out apparatus may be provided with the stimulating ray source control means 40 and the image signal acquiring means 50 as illustrated in FIG. 3, which have the constitutions identical with the constitutions employed in the radiation image information read-out apparatus provided with the first embodiment of the radiation image information detecting panel 1.

Each of the radiation image information detecting panel 1 in the first embodiment and the radiation image information detecting panel 1' in the second embodiment may be modified such that the second electrode layer 25 has a three-layer structure provided with a flat plate-shaped electrode layer, an electrical insulation layer, and a striped electrode layer. In such cases, the flat plate-shaped electrode layer of the second electrode layer 25 may be utilized as the electrode layer for the detecting section 20 or the detecting section 20', and the striped electrode layer of the second electrode layer 25 may be utilized as the electrode layer for the panel-shaped light source 30 or the panel-shaped light source 30'. Also, the third electrode layer 32 may be constituted of a striped electrode, which is normal to the striped electrode of the striped electrode layer of the second electrode layer 25, as viewed from above. In such cases, it is necessary for the constitution of the image signal acquiring means 50 to be altered appropriately.

In the cases of the electrode structure described above, each of the panel-shaped light source 30 and the panel-shaped light source 30' becomes equivalent to a light source, which is constituted of a plurality of point-like light sources arrayed in a surface-like form. However, in such cases, in order for the two-dimensional scanning of the point-like light sources to be performed quickly, the intensity of the light emitted by each of the point-like light sources should be set to be markedly high.

In the second embodiment described above, the timing, with which the voltage is applied between the first electrode layer 21 and the second electrode layer 25 of the detecting section 20', is controlled by a control section (not shown) such that, after each of the pulses of the stimulating rays having been produced has attenuated sufficiently and after the generation of the electric charges in the photo-conductor layer 23' due to the stimulating rays has been suppressed, the electric charges occurring with the light emitted by the stimulable phosphor layer 12' are detected.

Figure 7:
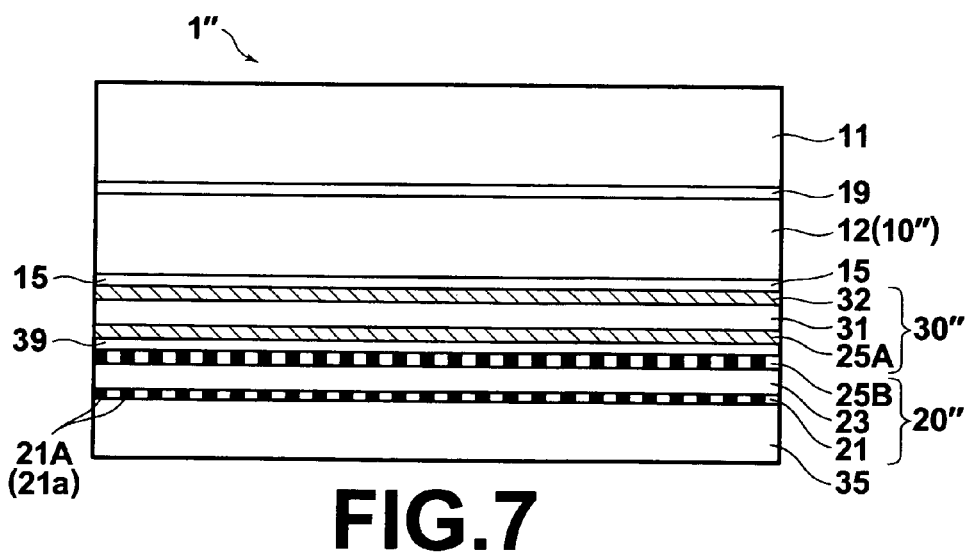
FIG. 7 is a sectional view showing a third embodiment of the radiation image information detecting panel in accordance with the present invention.

FIG. 7 is a sectional view showing a third embodiment of the radiation image information detecting panel in accordance with the present invention. In FIG. 7, similar elements are numbered with the same reference numerals with respect to FIG. 1. With reference to FIG. 7, a radiation image information detecting panel 1", which is the third embodiment of the radiation image information detecting panel in accordance with the present invention, comprises the first support 11. The radiation image information detecting panel 1" also comprises a reflecting layer 19. The radiation image information detecting panel 1" further comprises an image recording section 10", which is constituted of the stimulable phosphor layer 12. The radiation image information detecting panel 1" still further comprises the response speed converting fluorescent substance layer 15. The radiation image information detecting panel 1" also comprises a panel-shaped light source 30", which is constituted of the third electrode layer 32, the EL layer 31, and a second electrode layer 25A for the light source. The radiation image information detecting panel 1" further comprises an optical filter layer 39. The radiation image information detecting panel 1" still further comprises a detecting section 20", which is constituted of a second electrode layer 25B for the detecting section, the photo-conductor layer 23, and the first electrode layer 21. The radiation image information detecting panel 1" also comprises the second support 35. The first support 11, the reflecting layer 19, the image recording section 10", the response speed converting fluorescent substance layer 15, the panel-shaped light source 30", the optical filter layer 39, the detecting section 20", and the second support 35 are overlaid one upon another in this order. In the third embodiment, the panel-shaped light source 30" is located between the image recording section 10" and the detecting section 20". Also, the second electrode layer is separated into the second electrode layer 25A for the light source and the second electrode layer 25B for the detecting section. Further, the optical filter layer 39 is located between the second electrode layer 25A for the light source and the second electrode layer 25B for the detecting section.

The optical filter layer 39 acts to cut off the secondary stimulating rays, which have been emitted from the EL layer 31, such that the secondary stimulating rays may not impinge upon the side of the detecting section 20". Therefore, a radiation image, which has a high signal-to-noise ratio and is free from the adverse effect of the secondary stimulating rays, is capable of being acquired.

With the third embodiment of the radiation image information detecting panel 1", which is provided with the response speed converting fluorescent substance layer 15, the signal-to-noise ratio of the obtained radiation image is capable of being kept higher than a radiation image information detecting panel, which is provided with the optical filter layer 39 and is not provided with the response speed converting fluorescent substance layer 15.

Each of the third electrode layer 32, the second electrode layer 25A for the light source, and the second electrode layer 25B for the detecting section is a light-transmissive electrode. Also, each of the third electrode layer 32, the second electrode layer 25A for the light source, the second electrode layer 25B for the detecting section, and the first electrode layer 21 is the striped electrode having a plurality of linear electrodes. The linear electrodes constituting the third electrode layer 32, which is the electrode layer for the panel-shaped light source 30", and the linear electrodes constituting the second electrode layer 25A for the light source, which is the electrode for the panel-shaped light source 30", are parallel with each other. Also, the linear electrodes constituting the second electrode layer 25B for the detecting section, which is the electrode layer for the detecting section 20", and the linear electrodes constituting the first electrode layer 21, which is the electrode layer for the detecting section 20", are parallel with each other. Further, the linear electrodes constituting the panel-shaped light source 30" and the linear electrodes constituting the detecting section 20" are, approximately normal to each other, as viewed from above. Alternatively, either one of the striped electrode, which constitutes the third electrode layer 32 in the panel-shaped light source 30", and the striped electrode, which constitutes the second electrode layer 25A for the light source in the panel-shaped light source 30", maybe replaced by a planar electrode. Also, either one of the striped electrode, which constitutes the second electrode layer 25B for the detecting section in the detecting section 20", and the striped electrode, which constitutes the first electrode layer 21 in the detecting section 20", may be replaced by a planar electrode.

When necessary, the reflecting layer 19, which is located between the first support 11 and the image recording section 10", may be omitted. However, in cases where a material having a low light reflectivity, such as a carbon plate, is utilized as the material for the first support 11, and in cases where a radiation detector having a high sensitivity (e.g., a radiation detector for infants, for which the radiation dose is to be minimized) is to be thereby produced, the reflecting layer 19 should preferably be utilized. In the cases of a high image sharpness type of radiation detector (e.g., a radiation detector for mammography), the reflecting layer 19 need not necessarily be utilized. The functions of the constituent elements are basically identical with the functions of the constituent elements described above.

As in the cases of the aforesaid second embodiment of the radiation image information detecting panel 1', in cases where the EL layer 31 in the third embodiment of the radiation image information detecting panel 1" is constituted of an EL layer capable of emitting the light having a sufficiently short pulse width, the separation of the secondary stimulating rays and the light emitted by the stimulable phosphor layer 12 from each other is capable of being performed more accurately.

What is claimed is:

1. A radiation image information read-out apparatus, comprising:
    a stimulable phosphor layer, which stores radiation image information, and which emits light of an intensity proportional to the radiation image information when secondary stimulating rays are irradiated to the stimulable phosphor layer;
    a response speed converting fluorescent substance layer, which converts the light emitted by the stimulable phosphor layer into light having a life time longer than a light emission life time of the light emitted by the stimulable phosphor layer;
    a photo-conductor layer, which exhibits electrical conductivity when the light having been obtained from the conversion performed by the response speed converting fluorescent substance layer is irradiated to the photo-conductor layer; and
    an electroluminescent layer which emits the secondary stimulating rays, which are to be irradiated to the stimulable phosphor layer, when a voltage is applied across the electroluminescent layer;
    stimulating ray source control means for controlling the application of the voltage across the electroluminescent layer, such that scanning of the stimulable phosphor layer with the secondary stimulating rays is performed, and for causing the electroluminescent layer to emit pulsed secondary stimulating rays at predetermined time intervals; and
    image signal acquiring means for detecting electric charges that are generated in the photo-conductor layer within the predetermined time intervals after the pulsed secondary stimulating rays have been emitted from the electroluminescent layer, thereby acquiring an image signal that represents the radiation image information,
    wherein all of the layers are overlaid one upon another and combined with one another into an integral body.

2. A radiation image information read-out apparatus as defined in claim 1, wherein a laminate including the stimulable phosphor layer, the response speed converting fluorescent substance layer and the photo-conductor layer and the electroluminescent layer are overlaid one upon the other and combined with each other into an integral body.

3. A radiation image information read-out apparatus as defined in claim 2, wherein the electroluminescent layer is a layer which emits light, as the secondary stimulating rays, which has a pulse width sufficiently shorter than the light emission life time of the response speed converting fluorescent substance layer.

4. A radiation image information read-out apparatus as defined in claim 1, wherein the stimulable phosphor layer, a laminate including the response speed converting fluorescent substance layer and the electroluminescent layer and the photo-conductor layer are overlaid one upon another in this order.

5. A radiation image information read-out apparatus as defined in claim 4, wherein the electroluminescent layer is a layer which emits light, as the secondary stimulating rays, which has a pulse width sufficiently shorter than the light emission life time of the response speed converting fluorescent substance layer.

6. A radiation image information read-out apparatus as defined in claim 4, further comprising:
    an optical filter layer for cutting off the secondary stimulating rays, which have been emitted by the electroluminescent layer, the optical filter layer being located between the electroluminescent layer and the photo-conductor layer.

7. A radiation image information read-out apparatus as defined in claim 1, wherein the phosphor layer abuts the response speed converting fluorescent substance layer.

8. A radiation image information read-out apparatus as defined in claim 1, wherein the light emission life time corresponds to a time required for an intensity of the light emitted at a time at which the secondary stimulating rays are turned off, to become equal to a level of 1/e, where e corresponds to Euler's number.

9. A radiation image information read-out apparatus, comprising:
    a stimulable phosphor layer, which stores radiation image information, and which emits light of an intensity proportional to the radiation image information when secondary stimulating rays are irradiated to the stimulable phosphor layer;
    a photo-conductor layer, which exhibits electrical conductivity when the light emitted by the stimulable phosphor layer is irradiated to the photo-conductor layer; and
    an electroluminescent layer which emits light acting as the secondary stimulating rays, which are to be irradiated to the stimulable phosphor layer, when a voltage is applied across the electroluminescent layer, the light emitted by the electroluminescent layer having a pulse width sufficiently shorter than the light emission life time of the light emitted by the stimulable phosphor layer;
    stimulating ray source control means for controlling the application of the voltage across the electroluminescent layer, such that scanning of the stimulable phosphor layer with the secondary stimulating rays is performed, and for causing the electroluminescent layer to emit pulsed secondary stimulating rays at predetermined time intervals; and
    image signal acquiring means for detecting electric charges that are generated in the photo-conductor layer within the predetermined time intervals after the pulsed secondary stimulating rays have been emitted from the electroluminescent layer, thereby acquiring an image signal that represents the radiation image information,
    wherein all of the layers are overlaid one upon another and combined with one another into an integral body.

10. A radiation image information read-out apparatus as defined in claim 9, wherein a laminate including the stimulable phosphor layer and the photo-conductor layer and the electroluminescent layer are overlaid one upon the other and combined with each other into an integral body.

11. A radiation image information read-out apparatus as defined in claim 9, wherein the stimulable phosphor layer, the electroluminescent layer and the photo-conductor layer are overlaid one upon another in this order.

12. A radiation image information read-out apparatus as defined in claim 11, further comprising:

an optical filter layer for cutting off the secondary stimulating rays, which have been emitted by the electroluminescent layer, the optical filter layer being located between the electroluminescent layer and the photo-conductor layer.

13. A radiation image information read-out apparatus as defined in claim 9, wherein the photo-conductor layer abuts the electroluminescent layer.

14. A radiation image information read-out apparatus as defined in claim 9, wherein the light emission life time corresponds to a time required for an intensity of the light emitted at a time at which the secondary stimulating rays are turned off, to become equal to a level of 1/e, where e corresponds to Euler's number.

15. A radiation image information read-out apparatus, comprising:

a stimulable phosphor layer, which stores radiation image information, and which emits light of an intensity proportional to the radiation image information when secondary stimulating rays are irradiated to the stimulable phosphor layer;

an electroluminescent layer which emits the secondary stimulating rays, which are to be irradiated to the stimulable phosphor layer, when a voltage is applied across the electroluminescent layer;

an optical filter layer for cutting off the secondary stimulating rays, which have been emitted by the electroluminescent layer; and a photo-conductor layer, which exhibits electrical conductivity when the light emitted by the stimulable phosphor layer is irradiated to the photo-conductor layer;

stimulating ray source control means for controlling the application of the voltage across the electroluminescent layer, such that scanning of the stimulable phosphor layer with the secondary stimulating rays is performed, and for causing the electroluminescent layer to emit pulsed secondary stimulating rays at predetermined time intervals; and image signal acquiring means for detecting electric charges that are generated in the photo-conductor layer within the predetermined time intervals after the pulsed secondary stimulating rays have been emitted from the electroluminescent layer, thereby acquiring an image signal that represents the radiation image information, wherein the stimulable phosphor layer, the electroluminescent layer, the optical filter layer, and the photo-conductor layer are overlaid one upon another in this order and combined with one another into an integral body.

* * * * *